United States Patent [19]

Murray

[11] 4,015,855
[45] Apr. 5, 1977

[54] IMPLEMENT HITCH

[76] Inventor: Clarence R. Murray, P.O. Box 1227, Erick, Okla. 73645

[22] Filed: Feb. 27, 1976

[21] Appl. No.: 662,143

[52] U.S. Cl. .......................... 280/415 A; 172/248; 280/461 A; 280/479 R; 280/515
[51] Int. Cl.² .......................................... B60D 1/04
[58] Field of Search .......... 280/477, 415 A, 415 R, 280/446 A, 446 R, 479 R, 461 A, 460 R, 460 A, 456 A, 456 R, 515, 508, 504; 172/248, 677, 678, 679, 680

[56] References Cited

UNITED STATES PATENTS

| 3,716,253 | 2/1973 | Gniffke | 280/479 R |
| 3,856,331 | 12/1974 | Bogdanovich | 280/479 R |
| 3,889,979 | 6/1975 | Schmiesing | 280/446 R |

Primary Examiner—Joseph F. Peters
Assistant Examiner—John A. Pekar
Attorney, Agent, or Firm—William R. Laney

[57] ABSTRACT

A hitch for connecting an agricultural implement to a tractor including an A-frame secured to the upper side of a transverse draw bar, the draw bar having a plurality of link-engaging brackets at its opposite ends for engaging the lateral lifting links of the tractor, and further having a clevis bracket at its central portion and on the opposite side of the draw bar from the link-engaging brackets for connecting the tongue of an agricultural implement thereto. The hitch further includes a cylinder-supporting plate projecting from a central crossbar of the A-frame to a position over the clevis bracket and supporting on the upper side thereof, a hydraulic cylinder which has its upper end pivotally connected through a suitable bracket to a plate secured to the apex of the A-frame. A piston rod extends from the lower end of the cylinder through the supporting plate provided therefor, and is pivotally connected through a flexible joint to a connecting pin which is positioned to be extended through a pair of vertically aligned apertures in the clevis bracket. On the opposite side of the A-frame crossbar from the cylinder-supporting plate, a pair of central link bracket plates project horizontally from the crossbar and contain a pair of aligned apertures to facilitate connection of the central adjusting link of the three hitching elements of a tractor to the hitch.

9 Claims, 4 Drawing Figures

IMPLEMENT HITCH

BRIEF DESCRIPTION OF THE PRIOR ART

Over the years and until recently, various types of hitch structures have been designed and proposed for enabling agricultural implements to be attached to the three-point linkage of agricultural tractors. The form assumed by these hitch structures has changed as the size and power of agricultural tractors, and the weight of the implements towed therebehind, have increased. In some of the earlier patents on structures of this type, such as U.S. Pat. Nos. 2,321,516; 2,341,807 and 2,465,641 the hitch structure generally included a frame made up of a pair of side frame members which were horizontally spaced at the lower end, and there interconnected by some form of draw bar or plate, and which were convergent at the upper ends for the purpose of receiving the central hitch link of the tractor. Generally, some form of projecting male studs were provided on the outer sides of this frame to permit the lateral lifting links of the three-point linkage of the tractor to be connected to such studs by alignment of the openings at the ends of the lateral hitch links with the studs, and extension of the studs through these openings.

The framework structures provided in the hitching apparatus of the type described generally were relatively lightweight in the era of earlier agricultural tractors having lighter implements towed therebehind. Characteristically, however, with the central hitch link of the tractor connected to the top of the implement hitch framework, a high bending moment was imposed on the framework as a result of the distance separating the central hitch link from the lower disposed lateral lifting links, and especially such distance between the central hitch link and the point of connection of the towed implement to the draw bar at the lowest portion of the framework. Moreover, in all of the hitching structures disclosed in such earlier versions, connection of the agricultural implement to the implement hitch was effected manually by the insertion of a pin through registering holes carried on the tongue of the implement and in the draw bar constituting a part of the hitch structure.

In more recent years, the structural strength of the frameworks of such hitch devices adapted to be connected to the three-point linkage of the tractor has been increased. Means for entirely automatic connection of the hitch structure to the tongue of the implement to be towed has not been proposed, however, and this is still often effected with a handle which projects within reach of the operator of the tractor as shown in Johnson U.S. Pat. No. 3,151,885 and in Williams U.S. Pat. No. 3,874,704, or in some instances, with a cord or lanyard as shown in Frandsen et al. U.S. Pat. No. 3,450,220. Also, some of the hitches provided are still of relatively lightweight construction and unsuitable for towing relatively heavy implements therebehind, as in the case of the lightweight hitch shown in Williams U.S. Pat. No. 3,874,704.

It is also generally still true that in substantially all of the hitch structures which include frames having side frame elements which connect to a draw bar at the lower end and converge at the upper end, provision is made to connect the central hitch link of the tractor linkage to the upper end or top portion of the hitch structure framework, thus continuing to impose a high bending moment and strain on the framework as a result of the substantial displacement of this point of connection from the load imposed on the lowest portion of the framework by the implement towed behind the tractor. Further, it has not been proposed to transversely brace the central portion of the hitch frame by the extension of a horizontal member between the two side frame elements. Difficulty still continues to be encountered in jockeying the tractor and/or implement so as to properly align the lateral lifting links of the tractor with projecting studs projecting to the outer sides of the hitch frame so as to register the openings in the ends of the lateral lift links with these protuberant studs.

BRIEF DESCRIPTION OF THE PRESENT INVENTION

The present invention provides an implement hitch which can be used for automatically coupling a towed agricultural implement to an agricultural tractor, and which is mechanically strong in construction and easily mounted on the lifting linkage of a tractor.

Broadly described, the implement hitch of the present invention comprises an A-frame which includes a pair of convergent side frame members interconnected by a centrally disposed crossbar or frame member. At the lower end of the A-frame, a transverse draw bar is secured across the side frame members of the A-frame. The draw bar is provided with a plurality of link-engaging brackets at its opposite ends for engaging the lateral lifting links of a tractor, and is further characterized in having a clevis bracket projecting rearwardly from its central portion on the opposite side of the draw bar from the link-engaging brackets, thus facilitating connection of the tongue of an agricultural implement to the implement hitch. The hitch further includes a cylinder-supporting plate projecting from the central crossbar of the A-frame to a position over the clevis bracket. A hydraulic cylinder is supported on the upper side of the cylinder-supporting plate, and has its upper end pivotally connected through a suitable bracket to a plate secured to the apex of the A-frame. A piston rod extends from the lower end of the cylinder through the supporting plate upon which the cylinder rests, and is pivotally connected through a flexible joint to a connecting pin which is positioned to be extended through aligned apertures in the clevis bracket so as to couple the implement tongue to the clevis bracket. On the opposite side of the A-frame crossbar from the cylinder-supporting plate, a pair of central link bracket plates project horizontally from the crossbar and contain a pair of aligned apertures to facilitate connection to the implement hitch of the central adjusting link of the three hitching elements of the tractor.

An important object of the invention is to provide an implement hitch which can be quickly and easily mounted on the lifting linkage of an agricultural tractor and thereafter used for automatically coupling an agricultural implement to the tractor without the necessity for the operator of the tractor to dismount from the operator's seat or cab.

A further object of the invention is to provide an implement hitch for use in coupling an agricultural implement to a tractor, which hitch is characterized in especially high mechanical strength, and is designed to be mounted on the tractor lifting linkage in such a way that excessive strains or bending moments are not imposed upon an A-frame constituting the main structural element of the implement hitch.

A further object of the invention is to provide an implement hitch which can be connected to a three-point hitch type hookup of an agricultural tractor with the lateral lifting links of the tractor being easily connectable to brackets provided therefor on the implement hitch.

A further object of the invention is to provide an implement hitch which is characterized in having a long and trouble-free operating life.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

DETAILED DESCRIPTION OF A PREFERRED EMBODIMENT OF THE INVENTION

Figure 1:
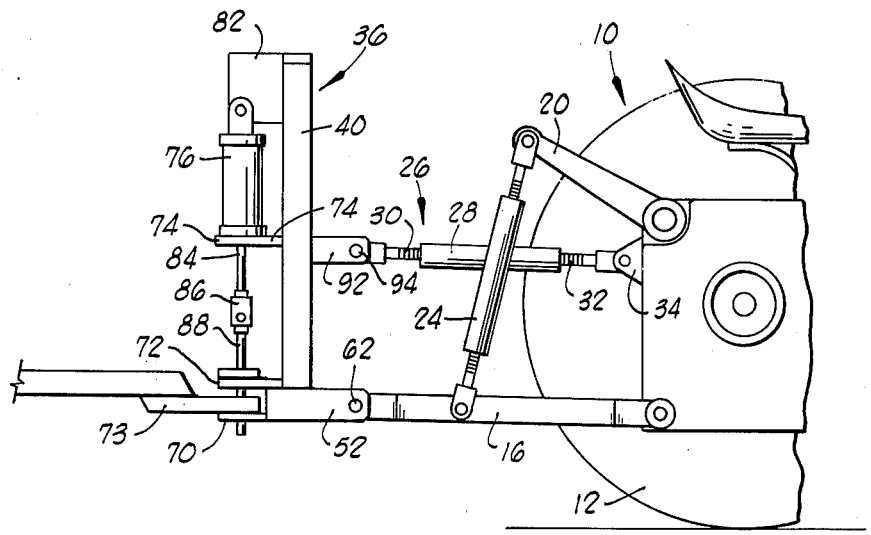
FIG. 1 is a side elevation view illustrating the implement hitch of the invention connected to the three-point linkage of an agricultural tractor, and illustrating the tongue of a towed agricultural implement connected to the hitch.
Figure 2:
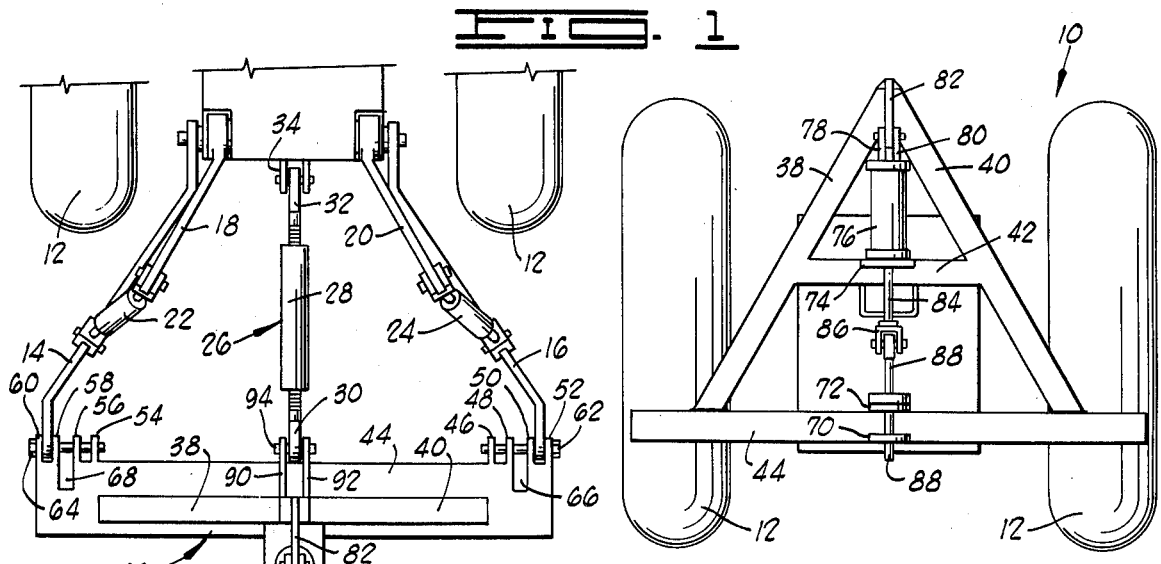
FIG. 2 is a plan view of the structure illustrated in FIG. 1, but not illustrating the tongue of the agricultural implement.
Figure 3:
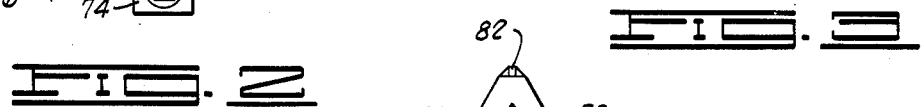
FIG. 3 is a rear elevation view of the implement hitch of the invention as it appears when mounted behind an agricultural tractor.
Figure 4:
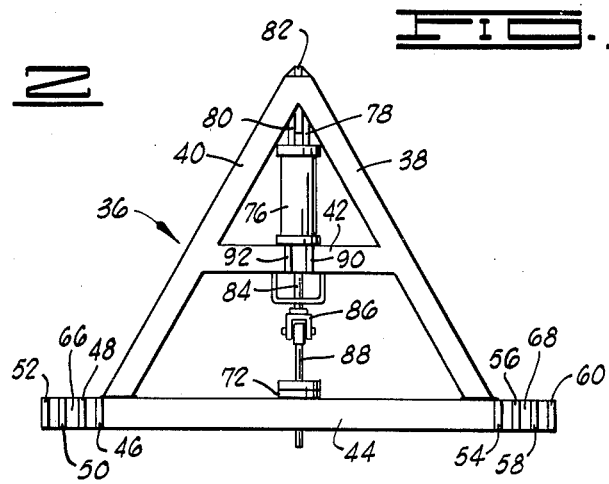
FIG. 4 is a front elevation view of the implement hitch.

Referring initially to FIG. 1, the rear portion of an agricultural tractor, designated generally by reference numeral 10, is provided with the usual ground-engaging wheels 12 and connecting links used for connecting various types of agricultural implements behind the tractor. The connecting links include a pair of lateral lifting links 14 and 16 which are pivotally connected at their forward ends to the chassis of the tractor. The lateral lifting links 14 and 16 are elevated by means of hydraulically operated lift arms 18 and 20 which are connected to a central portion of the lifting links 14 and 16 by means of turnbuckle subassemblies 22 and 24. The three-point hitch structure conventionally provided on such tractors further includes an elevated central adjusting link, designated generally by reference numeral 26, and including an internally threaded turnbuckle sleeve 28 which engages a threaded rear rod 30 and a threaded front rod 32. The front rod 32 is pivotally connected to a suitable bracket 34 on the tractor 10 for pivotation about a horizontal axis.

The implement hitch of the present invention is designated generally by reference numeral 36. The implement hitch includes an A-frame made up of a pair of divergent legs 38 and 40 which are joined at their convergent upper ends. A central crossbar 42 joins the midportions of the legs 38 and 40. The lower ends of the divergent legs 38 and 40 of the A-frame are secured by welding or other suitable means to a horizontally extending draw bar 44.

At its opposite ends and on its forward side, the draw bar 44 carries, at each of these ends, two pairs of bracket plates. Thus, at one end of the draw bar, a pair of inner bracket plates 46 and 48 are provided, and are aligned with a pair of outer bracket plates 50 and 52.

At its other end, the draw bar 44 carries a pair of inner bracket plates 54 and 56, and a pair of outer bracket plates 58 and 60. The pairs of bracket plates 46–52 at one end of the draw bar are provided with aligned apertures or openings for receiving a coupling pin 62. In similar fashion, the bracket plates 54–60 at the other end of the draw bar carry aligned openings or apertures to receive a coupling pin 64. The respective bracket pairs at opposite ends of the draw bar are separated by slots 66 and 68 which extend into the forward side of the draw bar in a direction normal to the longitudinal axis of the draw bar.

At the rear side of the draw bar, which is the side thereof opposite the side carrying the bracket plates previously described, the draw bar has a rearwardly projecting clevis bracket made up of a lower plate 70 and a parallel, vertically spaced upper plate 72 which is secured to the upper side of the draw bar. The upper and lower plates 70 and 72 of the clevis bracket are spaced sufficiently to permit the insertion therebetween of the forward end portion of the tongue 73 of an agricultural implement. Further, the plates 70 and 72 carry aligned openings or apertures to facilitate the extension through these apertures, and through a registering aperture carried on the implement tongue 73, of a connecting pin in a manner hereinafter described.

Welded to a central portion of the central crossbar 42 of the A-frame is a rearwardly projecting cylinder-supporting plate 74. The cylinder-supporting plate 74 supports the lower end of a hydraulic cylinder 76. The upper end of this cylinder is connected through a pair of opposed parallel ears 78 and 80 to a cylinder bracket 82 welded to the apex of the A-frame. The piston rod 84 which projects from the cylinder 76 extends through a suitable slot or aperture formed through the cylinder-supporting plate 74, and has its lower end connected to a U-shaped bracket 86. The U-shaped bracket 86 is pivotally pinned to the upper end of a hitch pin 88. The hitch pin 88 has its axis aligned with the openings through the upper and lower hitch plates 70 and 72 so that the hitch pin can be extended through these hitch plates when connecting an agricultural implement to the hitch.

On the opposite side of the A-frame from the cylinder-supporting plate 74, and projecting forwardly from a central portion of the central crossbar 42 of the A-frame are a pair of connection brackets 90 and 92 carrying aligned apertures to facilitate the connection thereto of the rear rod 30 of the central adjusting link 26.

In the use of the implement hitch of the present invention, the transverse width of the draw bar 44, together with the forward projection of the bracket plates 46–52 and 54–60 permit the A-frame 36 to be stood upright upon the ground. The tractor 10 can then be backed to the A-frame, and the lateral lifting links 14 and 16 lowered so that the rear ends thereof pass between selected pairs of the bracket plates. The coupling pins 62 and 64 are then extended through the aligned apertures or openings of the bracket plates and registering openings in the ends of the lateral lifting links 14 and 16 to effect connection of these members. The central adjusting link 26 can then be manually guided and, if necessary, extended, so that the rear rod 30 projects between the connection brackets 90 and 92 carried on the central crossbar 42 of the A-frame 36. The connecting pin 94 is then extended through the registering openings in the rear end of the rear rod 30 of the central adjusting link 26 and the two connection brackets 90 and 92.

The implement hitch 36 can now be elevated in the usual fashion by means of hydraulic controls accessible to the operator of the tractor, and functioning to elevate the lateral lift links. In general, the extent of elevation of the implement hitch 36 preparatory to coupling the tongue 73 of the agricultural implement thereto will be such that the space between the upper and lower plates 70 and 72, respectively, of the clevis bracket carried on the implement hitch will be aligned with the tongue 73. At this time, it will generally be preferable to support the tongue with a short stick or block so that it extends at a level above the ground at which it is in allignment with the clevis bracket constituted by the plates 70 and 72. The tractor 10 is then backed up slowly so as to move the tongue 73 of the implement between the plates 70 and 72 of the clevis bracket. The operator can then manipulate a suitable control accessible to the operator on the tractor to direct hydraulic fluid through suitable conduits (not shown) to the hydraulic cylinder 76. This will cause the piston rod 84 to be extended and the hitch pin 88 to be projected through the aligned openings in the plates 70 and 72 and the registering aperture through the forward end of the tongue 73. The implement is thus coupled or hitched to the tractor and is ready for towing.

From the following description of a preferred embodiment of the invention it will be perceived that the invention provides a ruggedly constructed, easily used implement hitch which can be employed to automatically connect or couple a towed implement to an agricultural tractor of the conventional type. Various changes and innovations can be made in the described and illustrated structure without departure from the basic principles which underlie the invention. Such changes and modifications are therefore intended to be circumscribed by the spirit and scope of the invention, except as the same may be necessarily limited by the appended claims or reasonable equivalents thereof.

What is claimed is:

1. An implement hitch for connecting an agricultural tractor to an agricultural implement comprising:
    an A-frame having a top and a bottom and including a pair of convergent side frame members interconnected by a central crossbar and having spaced lower ends;
    a horizontally extending draw bar extending between and interconnecting the lower ends of the side frame members of the A-frame, and having a front side and a rear side;
    link-engaging bracket pairs on the opposite ends of said draw bar and on the front side thereof, the brackets in each bracket pair defining a space for receiving therebetween the lateral lift links of an agricultural tractor;
    a clevis bracket projecting from the rear side of said draw bar at the center thereof and including two vertically spaced apertured plates;
    means on said central crossbar for connecting a central adjusting link of a tractor to said central crossbar;
    power cylinder supporting means on said A-frame above said clevis bracket for supporting a power cylinder above said clevis bracket on said A-frame;
    a piston rod extensible from said power cylinder and projecting downwardly therefrom; and
    pin means connected to said piston rod and aligned with the apertures in said vertically spaced plates for extension therethrough.

2. The implement hitch defined in claim 1 wherein said power cylinder supporting means on said A-frame above said clevis bracket comprises a cylinder bracket welded to the converged upper ends of said side frame members projecting from said A-frame in vertical alignment above said clevis bracket, said cylinder bracket being pivotally connected to one end of said power cylinder.

3. An implement hitch as defined in claim 2 wherein said power cylinder supporting means is further characterized in including a cylinder supporting plate projecting from a central portion of said crossbar over said clevis bracket and under said cylinder bracket.

4. An implement hitch as defined in claim 1 wherein said pin means includes:
    a pin extensible through the apertures in said vertically spaced plates of said clevis bracket; and
    a flexible coupling interconnecting said pin and said piston rod.

5. An implement hitch as defined in claim 4 wherein said pin means includes:
    a pin extensible through the apertures in said vertically spaced plates of said clevis bracket; and
    a flexible coupling interconnecting said pin and said piston rod.

6. An implement hitch for connecting implements to a farm tractor comprising:
    an A-frame having a top, a bottom, a forward side and a rear side, said A-frame including a pair of convergent side frame members interconnected by a central crossbar, and having spaced lower ends and intersecting upper ends;
    a horizontally extending draw bar extending between, and interconnecting, the lower ends of the side frame members of the A-frame and having a front side and a rear side;
    means on said draw bar for securing the lateral lift links of an agricultural tractor to the opposite ends of said draw bar;
    means on said central crossbar for connecting a central adjusting link of a tractor to said central crossbar;
    a cylinder supporting plate projecting to the rear side of said A-frame from said crossbar;
    a cylinder bracket welded to the converged upper ends of said side frame members and positioned above said cylinder supporting plate;
    a hydraulic cylinder supported on said cylinder supporting plate and having an end pivotally connected to said cylinder bracket;
    a piston rod projecting downwardly from said hydraulic cylinder;
    a clevis bracket secured to the rear side of said draw bar at a location below said cylinder supporting plate; and
    pin means connected to said piston rod for movement therewith and cooperating with said clevis bracket for engaging and disengaging the tongue of an agricultural implement.

7. An implement hitch as defined in claim 6 wherein said means on said central crossbar for connecting a central adjusting link of a tractor to said central crossbar comprises a pair of spaced connection brackets secured to the crossbar and having a pair of aligned apertures therethrough.

8. An implement hitch as defined in claim 7 wherein said lateral lift link securing means comprises link-engaging bracket pairs on the opposite ends of said draw bar and facing the forward side of said A-frame for connection of the lateral links of a tractor to said A-frame.

9. An implement hitch as defined in claim 8 wherein said pin means comprises:
- a pin extensible through the apertures in said vertically spaced plates of said clevis bracket; and
- a flexible coupling interconnecting said pin and said piston rod.

* * * * *